US012785903B2

(12) United States Patent
Gerami et al.

(10) Patent No.: US 12,785,903 B2
(45) Date of Patent: Nov. 3, 2026

(54) HYBRID AUTOMATIC REPEAT REQUEST TRANSFER

(71) Applicant: Telefonaktiebolaget LM Ericsson (PUBL), Stockholm (SE)

(72) Inventors: Majid Gerami, Lund (SE); Bikramjit Singh, Raasepori (FI); Jan Christoffersson, Luleå (SE); Min Wang, Luleå (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 288 days.

(21) Appl. No.: 18/568,458

(22) PCT Filed: Jun. 9, 2021

(86) PCT No.: PCT/EP2021/065408
§ 371 (c)(1),
(2) Date: Dec. 8, 2023

(87) PCT Pub. No.: WO2022/258165
PCT Pub. Date: Dec. 15, 2022

(65) Prior Publication Data

US 2024/0275561 A1 Aug. 15, 2024

(51) Int. Cl.
*H04L 5/00* (2006.01)
*H04L 1/1812* (2023.01)
*H04W 72/25* (2023.01)

(52) U.S. Cl.
CPC .......... *H04L 5/0055* (2013.01); *H04L 1/1812* (2013.01); *H04W 72/25* (2023.01)

(58) Field of Classification Search
CPC ..... H04L 5/0055; H04L 1/1812; H04W 72/25
See application file for complete search history.

(56) References Cited

U.S. PATENT DOCUMENTS

2014/0233481 A1* 8/2014 Feng ..................... H04L 5/0053 370/329
2015/0163021 A1* 6/2015 Braithwaite .......... H04W 72/21 370/315

(Continued)

FOREIGN PATENT DOCUMENTS

EP 2768267 A1 8/2014
EP 3522592 A1 8/2019
EP 3962122 B1 * 7/2025 .......... H04W 72/542

OTHER PUBLICATIONS

3GPP TSG RAN WG1 Meeting #89, Hangzhou, P.R. China May 15-19, 2017; Source: Intel Corporation; Title: Sidelink UE-to-NW Relaying for Wearable and IoT Use Cases; Agenda Item: 6.2.9.2.3.1 (R1-1707332).

(Continued)

*Primary Examiner* — Khai M Nguyen
(74) *Attorney, Agent, or Firm* — Baker Botts L.L.P.

(57) ABSTRACT

A method (800) of transferring Hybrid Automatic Repeat Request, HARQ, positive Acknowledgement, ACK, or Negative Acknowledgement, NACK, in a wireless communication system is presented. The wireless communication system comprises a first wireless device (110), a second wireless device (120) and a network node (150). The method (800) comprises transmitting (810), by the network node (150), a first transmission (510) to the first wireless device (110). In response thereto, the first wireless device (110) transmits (820) a first HARQ-ACK/NACK (515) associated with the first transmission (510). Responsive to control information provided to the second wireless device (120) indicating that the first HARQ-ACK/NACK (515) is to be forwarded to the network node (150), the second wireless device (120) relays (830) the first HARQ-ACK/NACK (515) to the network node (150).

15 Claims, 8 Drawing Sheets

(56) References Cited

U.S. PATENT DOCUMENTS

| | | | | |
|---|---|---|---|---|
| 2016/0295494 A1* | 10/2016 | Gulati | ................. | H04W 72/542 |
| 2018/0206176 A1* | 7/2018 | Panteleev | ............. | H04W 40/22 |
| 2021/0105126 A1* | 4/2021 | Yi | ......................... | H04L 1/1671 |
| 2022/0053521 A1* | 2/2022 | Yoshioka | .............. | H04L 1/1614 |

OTHER PUBLICATIONS

3GPP TSG RAN WG1 Meeting #89, Hangzhou, P.R. China May 15-19, 2017; Source: Intel Corporation; Title: Sidelink Resource Allocation and Configuration for Wearable and IoT Use Cases; Agenda item: 6.2.9.2.3.2 (R1-1707333).

3GPP TSG-RAN WG2 Meeting #105, Athens, Greece, Feb. 25-Mar. 1, 2019; Source: CATT; Title: HARQ Procedure for Mode 1; Agenda Item: 11.4.2.2 (R2-1900218 (Revision of R2-1816897)).

ETSI TS 138 213 V16.4.0 (Jan. 2021); 5G; NR; Physical layer procedures for control (3GPP TS 38.213 version 16.4.0 Release 16).

3GPP TR 23.752 V17.0.0 (Mar. 2021); 3rd Generation Partnership Project; Technical Specification Group Services and System Aspects; Study on system enhancement for Proximity based Services (ProSe) in the 5G System (5GS) (Release 17).

PCT International Search Report issued for International application No. PCT/EP2021/065408—Apr. 4, 2022.

PCT Written Opinion of the International Searching Authority issued for International application No. PCT/EP2021/065408—Apr. 4, 2022.

* cited by examiner

HYBRID AUTOMATIC REPEAT REQUEST TRANSFER

PRIORITY

This nonprovisional application is a U.S. National Stage Filing under 35 U.S.C. § 371 of International Patent Application Serial No. PCT/EP2021/065408 filed Jun. 9, 2021 and entitled "HYBRID AUTOMATIC REPEAT REQUEST TRANSFER" which is hereby incorporated by reference in its entirety.

TECHNICAL FIELD

The present invention relates to transfer of ACK/NACK in a wireless communications network and more precisely to a method of transferring Hybrid Automatic Repeat Request, HARQ-ACK/NACK in a wireless communication system.

BACKGROUND

In modern communications system, capacity and reliability of communication is of great importance. Several methods for increased reliability are available and one such method is to use an automatic repeat request, ARQ, scheme. The ARQ scheme allows errors in received information bits to be corrected by retransmission of data. Generally, this may comprise one or several schemes of how and if a retransmission is to be performed, exemplary schemes are stop and wait, SAW, go-back-N, GBN, selective repeat, SR, etc.

In order to further increase reliability of communications, the ARQ scheme may be combined with a Forward Error Correction, FEC, scheme forming, what is commonly known as a Hybrid Automatic Repeat Request, HARQ, scheme. The FEC scheme allows incorrectly received information bits to be corrected by an added error correction code.

Generally, in an HARQ scheme, the receiving entity tries to perform error correction by means of the error correction code, and if error correction fails, a retransmission is requested by a negative acknowledge, NACK, is transmitted by the receiving entity to a transmitting entity. Upon reception of the NACK, the transmitting entity retransmits data in accordance with a HARQ mode and the receiving entity combines the retransmitted data with the previously, erroneously, received data, effectively improving the reliability of the communication. Analogously, if the reception of the information bits was successful, the receiving entity transmits a positive acknowledgement, ACK, to the transmitting entity and no retransmission is required.

In a HARQ scheme, information bits transmitted by the transmitting entity will require downlink DL capacity in the communications system for transfer, and each ACK/NACK transmitted by the receiving entities will require uplink UL capacity in the communications system. The number of UL resources for reporting ACK/NACK are limited and it may very well be that a UL link budget is worse than a corresponding DL link budget.

SUMMARY

It is in view of the above considerations and others that the various embodiments of this disclosure have been made. The present disclosure therefor recognizes the fact that there is a need for improvement of the existing art described above.

It is a general object of the embodiments described herein to provide a new type of method for transferring Hybrid Automatic Repeat Request, HARQ, positive Acknowledgement, ACK, or Negative Acknowledgement, NACK, in a wireless communication system which is improved over the prior art and which eliminates or at least mitigates one or more of the drawbacks discussed above. More specifically, an object of the embodiments discussed in this disclosure is to provide a method that enables L1 relaying.

In a first aspect, a method of transferring Hybrid Automatic Repeat Request, HARQ, positive Acknowledgement, ACK, or Negative Acknowledgement, NACK, in a wireless communication system is presented. The wireless communication system comprises a first wireless device, a second wireless device and a network node. The method comprises the network node transmitting a first transmission to the first wireless device. The first wireless device transmits, in response thereto, a first HARQ-ACK/NACK associated with the first transmission. Responsive to control information provided to the second wireless device indicating that the first HARQ-ACK/NACK is to be forwarded to the network node, the second wireless device relays the first HARQ-ACK/NACK to the network node.

In one variant, the first transmission is transmitted directly to the first wireless device. This is beneficial as it enables the relaying to be implemented selectively in the UL without affecting DL.

In one variant, the first wireless device determines if the first HARQ-ACK/NACK should be relayed by the second wireless device based on at least one of an uplink, UL, channel quality of the first wireless device, an UL channel resource availability of the first wireless device, an UL channel capacity of the first wireless device, and/or an urgency associated with the first HARQ-ACK/NACK. This is beneficial as the first wireless device may itself decide if the first HARQ-ACK/NACK should be relayed or not.

In one variant, the network node determines if the first HARQ-ACK/NACK should be relayed by the second wireless device based on at least one of an uplink, UL, channel quality of the first wireless device and/or the second wireless device, an UL channel resource availability of the first wireless device and/or the second wireless device, an UL channel capacity of the first wireless device and/or the second wireless device, and/or an urgency associated with the first HARQ-ACK/NACK. This is beneficial as the network node may itself decide if the first HARQ-ACK/NACK should be relayed or not.

In one variant, the first HARQ-ACK/NACK is transmitted across a sidelink responsive to that the first HARQ-ACK/NACK is to be relayed by the second wireless device. This is beneficial as the sidelink communication will not load the main UL/DL links and is extra beneficial if UL resources are scarce.

In one variant, the sidelink is one or more of a Physical Sidelink Feedback Channel, PSFCH, a Physical Sidelink Shared Channel, PSSCH, a Physical Sidelink Control Channel, PSCCH, a non-cellular communications link, a channel enabling physical layer decoding of HARQ-ACK/NACK, and/or a channel enabling higher-layer decoding of HARQ-ACK/NACK. This is beneficial as the sidelink communication will not load the main UL/DL links and is extra beneficial if UL resources are scarce.

In one variant the sidelink is selected by the first wireless device based on allocated resources provided by the network node. This is beneficial as the sidelink communication will not load the main UL/DL links and is extra beneficial if UL resources are scarce.

In one variant the sidelink is assigned by the network node (150). This is beneficial as the sidelink communication will not load the main UL/DL links and is extra beneficial if UL resources are scarce.

In one variant, the control information is provided to the first wireless device at least by the network node. This is beneficial as the network node possesses knowledge of network parameters that may be pertinent to the decision of relaying or not.

In one variant, the control information is provided to the second wireless device at least as an indication comprised in the first HARQ-ACK/NACK associated with first transmission. This is beneficial as it allows the decision to relay to be taken per HARQ-ACK/NACK.

In one variant, the wireless communication system further comprises one or more additional wireless devices. The method further comprises the network node transmitting an additional transmission to one of the one or more additional wireless devices. In response thereto, said one of the one or more additional wireless devices transmits an additional HARQ-ACK/NACK associated with the additional transmission. Responsive to control information provided to the second wireless device indicating that the additional HARQ-ACK/NACK and the first HARQ-ACK/NACK is to be forwarded to the network node, the second wireless device relays the first HARQ-ACK/NACK together with the additional HARQ-ACK/NACK to the network node. This is beneficial as several relayed HARQ-ACK/NACKs may be transmitted at the same time.

In one variant, the method further comprises the network node transmitting a second transmission to the second wireless device. The step of relaying further comprises relaying, by the second wireless device, a second HARQ-ACK/NACK associated with second transmission together with any other HARQ-ACK/NACK that are to be relayed to the network node (150). This is beneficial as the combination of several HARQ-ACK/NACK will reduce the signaling overhead and network load.

In one variant, the step of relaying comprises combining the first HARQ-ACK/NACK with any other HARQ-ACK/NACK that are to be relayed to the network node to provide a combined HARQ-ACK/NACK. The second wireless device relays the combined HARQ-ACK/NACK to the network node. This is beneficial as the combination of several HARQ-ACK/NACK will reduce the signaling overhead and network load.

In one variant, wherein at least one of the first transmission, the second transmission and/or the additional transmission are sent at different timeslots of a codebook. The HARQ-ACKs/NACKs associated with the transmissions that are sent at different timeslots and relayed by the second wireless device, are coded in one single line of the codebook. This is beneficial as the codebook size is reduced and thereby signaling overhead.

In one variant, wherein at least one of the first transmission, the second transmission and/or the additional transmission are sent at overlapping timeslots of the codebook, the HARQ-ACKs/NACKs associated with the transmissions sent at overlapping timeslots and relayed by the second wireless device, are coded on separate lines of the codebook, wherein each separate line is associated with a respective wireless device. This is beneficial as it allows a clear and straight forward association between a common codebook and the associated wireless devices.

In one variant only a HARQ-ACK is relayed. This is beneficial as it reduces network and signaling load.

In a second aspect, a first wireless device comprising one or more controllers is presented. Said one or more controllers are configured to, when the first wireless device is operable in a wireless communication system, perform the steps associated with first wireless device of the method according to the first aspect.

In a third aspect, a second wireless device comprising one or more controllers is presented. Said one or more controller are configured to, when the second wireless device is operable in a wireless communication system, perform the steps associated with second wireless device of the method according to the first aspect.

In a fourth aspect, an additional wireless device comprising one or more controllers is presented. Said one or more controllers are configured to, when the additional wireless device is operable in a wireless communication system, perform the steps associated with the additional wireless device of the method according to the first aspect.

In a fifth aspect, a network node comprising one or more controllers is presented. Said one or more controllers are configured to, when the network node is operable in a wireless communication system, perform the steps associated with network node of the method according to the first aspect.

In a sixth aspect, a wireless communication system comprising a first wireless device according to the second aspect, a second wireless device according to the third aspect and a network node according the fifth aspect.

In one variant, the wireless communication system further comprises an additional wireless device according to the fifth aspect.

BRIEF DESCRIPTION OF THE DRAWINGS

Embodiments of the invention will be described in the following; references being made to the appended diagrammatical drawings which illustrate non-limiting examples of how the inventive concept can be reduced into practice.

DETAILED DESCRIPTION OF EMBODIMENTS

Figure 1:
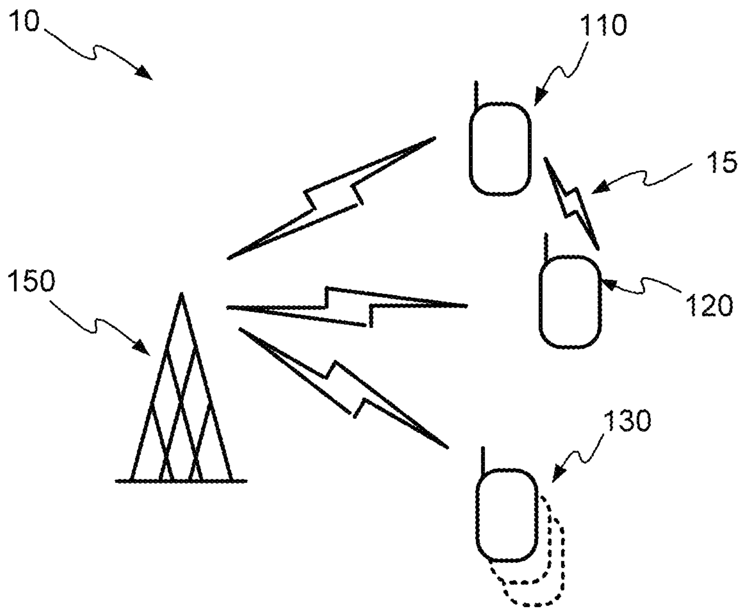
FIG. 1 is a schematic view of a wireless communication system according to an embodiment.

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

The term "coupled" is defined as connected, although not necessarily directly, and not necessarily mechanically. Two or more items that are "coupled" may be integral with each other. The terms "a" and "an" are defined as one or more unless this disclosure explicitly requires otherwise. The terms "substantially," "approximately," and "about" are defined as largely, but not necessarily wholly what is specified, as understood by a person of ordinary skill in the art. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method that "comprises," "has," "includes" or "contains" one or more steps possesses those one or more steps, but is not limited to possessing only those one or more steps.

Regarding scenarios and embodiments presented throughout this disclosure, albeit presented in specific terms, it should be understood that any specific terms may, unless otherwise is clearly stated, very well be replaced by more general, generic terms even if not explicitly specified. For example, the mentioning of specific signaling and control channel relating to e.g. specific cellular standards should be considered examples and this disclosure is, as the skilled person will appreciate after digesting the teachings herein, applicable to any suitable communication system, wireless or wired.

As mentioned earlier, the number of UL resources for reporting positive acknowledgement, ACK or negative acknowledgement, NACK, are limited and it may very well be that an uplink, UL, link budget is worse than a corresponding downlink, DL, link budget. This means that scenarios exist, wherein a wireless device, such as a User Equipment, UE, is unable to transmit an ACK/NACK to a network node. It may be that the capacity of a channel for transmitting ACK/NACK is limited or that frequency selective fading causes imbalance in the link budgets. Based on these findings, the inventors behind this disclosure have devised a method for improving the transmission of hybrid automatic repeat request, HARQ, in a wireless communication system. As will be clear to the person skilled in the art after digestion of the teachings of the present disclosure, the presented embodiments will e.g. reduce the risk of interferences between wireless devices, when e.g. one wireless device is at a location with poor signaling conditions, no additional latency is introduced as the case with e.g. Physical Uplink Control Channel, PUCCH, repetition, the required PUCCH resources are reduced increasing capacity of the wireless communication system and reduced and reduce the risk of HARQ ACK/NACK transmission errors.

With reference to FIG. 1, a wireless communication system 10 according to an embodiment will be introduced. The wireless communication system 10 comprises a first wireless device 110, a second wireless device 120 and a network node 150. The first wireless device 110 and the second wireless device 120 are in wireless communication with the network node 150. The network node 150 is configured to send transmissions to the first wireless device 110 and the second wireless device 120. Responsive thereto, the first wireless device 110 and the second wireless device 120 are configured to transmit an ACK or NACK to the network node 150 indicating a successful or unsuccessful reception of the transmission from the network node 150 by the respective wireless device 110, 120. In addition to the, the wireless communication system 10 may further comprise one or more additional wireless devices 130. Said one or more additional wireless devices 130 are in wireless communication with the network node 150. The network node 150 is configured to send transmissions to said one or more additional wireless devices 130. Responsive thereto, said one or more additional wireless devices 130 are configured to transmit an ACK or NACK to the network node 150 indicating a successful or unsuccessful reception of the transmission from the network node 150 by the respective additional wireless devices 130. In addition to being in communication with the network node 150, the wireless devices 110, 120, 130 may be in direct wireless communication with each other through a sidelink 15. In the wireless communication system 10 of FIG. 1, the first wireless device 110 and the second wireless device 120 are in communication across a sidelink 15.

The following sections provide a brief introduction to the concept and configuration of silenlink communication. The sidelink 15 may, in e.g. New Radio, NR devices be scheduled either by the network node 150, gNB, referred to as Mode 1, or autonomously by the wireless device 110, 120, 130, Mode 2. In Mode 2, the wireless device 110, 120, 130 selects sidelink resources from a (pre-)configured sidelink resource pool(s) based on a channel sensing mechanism. For the wireless devices 110, 120, 130 within coverage of a network node 150, the network node 150 may be configured to adopt Mode 1 or Mode 2. For wireless devices out-of-coverage, only Mode 2 can be adopted. For NR sidelink transmissions, at most one sidelink bandwidth part, BWP, may be configured on a carrier, and the minimum unit for resource scheduling in the frequency domain is a subchannel. Wherein a subchannel is composed of 10, 15, 20, 25, 50, 75, or 100 consecutive resource bocks, RBs, depending on practical configuration.

The sidelink 15 may be utilized as a layer 2 resource, which allows one wireless device 110, 120, 130 to relay data, generally a Protocol Data Unit, PDU, received from another wireless device 110, 120, 130 across the sidelink 15. The methodology of using the sidelink 15 for relaying a PDU is described in e.g. 3GPP TR 23.733 V15.1.0.

For a NR wireless device, the sidelink 15 comprises a number of physical channels, a Physical Sidelink Control Channel, PSCCH, carrying control information in the sidelink; a Physical Sidelink Shared Channel, PSSCH, carrying a data payload, PDU, in the sidelink and additional control information; a Physical Sidelink Broadcast Channel, PSBCH, carrying information for supporting synchronization in the sidelink 15; and a Physical Sidelink Feedback Channel, PSFCH, carrying feedback related to the successful or failed reception of a sidelink transmission. The PSFCH is transmitted by a sidelink receiving wireless device 110, 120, 130 for unicast and groupcast, which conveys 1-bit information over 1 RB for the HARQ-ACK and the HARQ-NACK. In addition, channel state information, CSI, is carried in the medium access control, MAC, control element, CE, over the PSSCH instead of the PSFCH. In the time domain, a time gap between the PSSCH and the PSFCH is configured. However, when a receiving wireless device 110, 120, 130 sends the HARQ ACK/NACK on the PSFCH, only the transmitting wireless device 110, 120, 130 has the capability to receive such ACK/NACK messages, and a network node 150 cannot receive this feedback transmission. Consequently, a network node 150 may not know whether to further allocate resources for a transmitting wireless device 110, 120, 130 to retransmit a transport block, TB, or not. To obtain resources of the PSSCH for subsequent retransmissions, a transmitting wireless device needs to forward the sidelink HARQ ACK/NACK message to a network node when a feedback message is received on the PSFCH. To further obtain resources for a transmitting wireless device to send the sidelink HARQ ACK/NACK to a network node 150, the network node 150 may allocate one physical uplink control channel, PUCCH, occurring after the last resource in the PSSCH set for initial sidelink transmissions. When a NACK is received by a network node 150, the network node 150 further allocates PSCCH and PSSCH resources for sidelink retransmissions, and this resource allocation is indicated in a Downlink Control Information, DCI, field in the case of dynamic grant. Alternatively, a transmitting wireless device 110, 120, 130 may launch the TB retransmission through the reserved PSCCH and the PSSCH in a case of a configured grant. In the Mode 2 resource allocation, when traffic arrives at a transmitting wireless device 110, 120, 130, this transmitting wireless device 110, 120, 130 is configured to autonomously select resources for the PSCCH and the PSSCH. To further minimize the latency of the feedback HARQ ACK/NACK transmissions and subsequently retransmissions, a transmitting wireless device 110, 120, 130 may also reserve resources for PSCCH/PSSCH for retransmissions.

The following sections provide a brief introduction to the concept and configuration of cellular transmissions, typically for NR devices. In NR, there are three types of HARQ-ACK code construction in NR, semi-static code construction, Type 1, dynamic code construction, Type 2, and one-shot feedback, Type 3. The latter was introduced in 3GPP Rel-16 for NR-U, in Rel-17 for NR. The general procedure for receiving downlink, DL, transmission is that the wireless device 110, 120, 130 monitors and decodes a Physical Downlink Control Channel, PDCCH, in slot n which points to a DL data scheduled in slot $n+K_0$, wherein $K_0$ is larger than or equal to zero. The wireless device 110, 120, 130 then decodes the data in the corresponding Physical Downlink Shared Channel, PDSCH. Finally, based on the outcome of the decoding the wireless device 110, 120, 130 sends an ACK of a correct decoding or a NACK of an incorrect decoding to the network node 150 at time slot $n+k_0+k_1$, in case of slot aggregation, $n+K_0$ would be replaced by the slot where the associated PDSCH ends. Both of $K_0$ and $k_1$ are indicated in the DCI. The resources for sending the acknowledgement are indicated by a Physical Uplink Control Channel, PUCCH, resource indicator, PRI, field in the DCI which points to one of PUCCH resources that are configured by higher layers.

Depending on e.g. a DL/UL slot configurations, or whether carrier aggregation or per code-block group, CBG, transmission is used in the DL, the feedback for several PDSCHs may need to be multiplexed in one single feedback. Generally, this is done by constructing HARQ-ACK codebooks. In NR, the wireless device 110, 120, 130 may be configured to multiplex the ACK/NACK bits using a semi-static codebook or a dynamic codebook.

Semi-static HARQ codebook, or Type 1 codebook, comprises a bit sequence where each element contains an ACK/NACK bit from a possible allocation in a certain slot, carrier, or TB. When the wireless device 110, 120, 130 is configured with a CBG and/or a time-domain resource allocation, TDRA, table with multiple entries; multiple bits are generated per slot and TB. It should be mentioned that the codebook is generally derived regardless of the actual PDSCH scheduling. The size and format of the semi-static codebook is generally preconfigured based on the mentioned parameters. The drawback of semi-static HARQ ACK codebook is that the size is fixed, and regardless of whether there is a transmission or not, a bit is reserved in the feedback matrix. In scenarios where the wireless device 110, 120, 130 has a TDRA table with multiple time-domain resource allocation entries configured; the table is pruned, i.e. entries are removed based on a specified algorithm in order to derive a TDRA table that only contains non-overlapping time-domain allocations. One bit is then reserved in the HARQ CB for each non-overlapping entry, that is assuming the wireless device 110, 120, 130 is capable of supporting reception of multiple PDSCH in a slot.

In the dynamic HARQ codebook, or type 2 codebook, an ACK/NACK bit is present in a codebook only if there is a corresponding transmission scheduled. To avoid any confusion between the network node 150 and the wireless device 110, 120, 130 on the number of PDSCHs that the wireless device 110, 120, 130 is expected to send a feedback for, a counter downlink assignment indicator, DAI, field is available in the DL assignment. The DAI field denotes accumulative number of serving cell-PDCCH occasion pairs in which a PDSCH is scheduled to a wireless device 110, 120, 130 up to the current PDCCH. In addition to this, a total DAI field is available which, when present, shows the total number of serving cell-PDCCH occasions up to, and including, all PDCCHs of a current PDCCH monitoring occasion. The timing for sending HARQ feedback is determined based on both PDSCH transmission slot with reference to PDCCH slot $k_0$ and the PUCCH slot that contains HARQ feedback $k_1$.

Assuming there are no errors in the downlink control signaling, a dynamic codebook would be straightforward. However, in the presence of an error in the downlink control signaling, the wireless device 110, 120, 130 and the network node 150 may have different understanding on the number of scheduled carriers, which would lead to an incorrect codebook size and possibly corrupt the feedback report for all carriers—and not only for the ones for which the downlink controls signaling was missed. If, by means of example, a wireless device 110, 120, 130 was scheduled for downlink transmission in two subsequent slots but missed the PDCCH and thereby the scheduling assignment for the first slot. As a result, the wireless device 110, 120, 130 will only transmit an acknowledgment for the second slot. The network node 150 on the other hand, tries to receive acknowledgments for both slots. This leads to mismatch. In NR, one way of mitigating this mismatch is by utilization of the downlink assignment index which is included in the DCI comprising the downlink assignment. The DAI field is further split into two parts, a counter DAI, cDAI, and, in the case of e.g. carrier aggregation, a total DAI, tDAI. The cDAI included in the DCI indicates the number of scheduled downlink transmissions up to the point the DCI was received in a carrier. The tDAI included in the DCI indicates the total number of downlink transmissions across all carriers up to this point in time, that is, the highest cDAI at the current point in time.

As present cellular wireless networks are defined, a wireless device 110, 120, 130 may be unable to reliably send a HARQ ACK/NACK to the network node 150 due to poor UL channel condition. As previously indicated, this may occur in frequency division duplex, FDD, systems in case of frequency selective fading where DL channels are good, but UL channels are poor. Similarly, valid also for time division duplex, TDD, an output power of a wireless device 110, 120, 130 may be reduced due to e.g. antenna loading causing mismatch affecting a gain of a transmitter power amplifier of the wireless device 110, 120, 130 more than a corresponding gain of a receiver low noise amplifier, LNA, of the wireless device 110, 120, 130. Also, the wireless device 110, 120, 13 may have limited power for uplink transmission, e.g., it is a permanently low power device or its power may have been temporarily reduced.

There are situations where PUCCH resources for reporting a HARQ-ACK/NACK and other signaling may be limited. This may be exemplified by a scenario wherein there are heavy downlink data-consumers and a TDD pattern is devised such that higher downlink transmissions are provided in a TDD pattern. Assume a TDD pattern is of 8 DL+1 UL slots wherein each DL slot is dedicated to one wireless device 110, 120, 130. The wireless device 110, 120, 130 receiving data in the first DL slot, slot 0, can report in timeslot 8, while a wireless device 110, 120, 130 receiving its data in a second DL slot, slot 1, will have to wait for a next available uplink slot.

In order to enhance PUCCH coverage, a wireless device 110, 120, 130 may apply repetitions for a PUCCH transmission up to a configurable number of times, e.g., 2, 4 or 8. One drawback with PUCCH repetition is that a wireless device 110, 120, 130 experiencing poor UL coverage may create interference to the other wireless device 110, 120, 130 with good coverage. In addition to this, additional latency, e.g., with 8 times of PUCCH repetitions, may be introduced. There may also be situations where there is an obstacle between a wireless device 110, 120, 130 and its network node 150. In such situations, increasing the PUCCH transmitted power or applying PUCCH repetition may not help in improving PUCCH coverage.

An alternative approach is to let a wireless device 110, 120, 130 with poor UL coverage connect to the network node via a relay wireless device 110, 120, 130. As network relay is currently being developed, e.g. 3GPP Rel-17. Relay architectures are only feasible to enable a relaying wireless device to relay data and control signaling above L2 of a remote wireless device to the network node 150. In other words, with current or planned relay architectures, it is not feasible to relay L1 signaling of a wireless device 110, 120, 130 by another wireless device 110, 120, 130 to the network node 150.

The inventors behind this disclosure have realized that it would be beneficial to, in the light of the above issues, develop mechanisms to enable a relay wireless device 110, 120, 130 to relay L1 signaling of a remote wireless device 110, 120, 130 to a network node 150. By configuring a wireless communications network 10 such that a first wireless device 110 receives HARQ-ACK feedbacks from a second wireless device 120 and optionally from one or more additional wireless devices 130, the first wireless device may combine the feedback(s) of the wireless devices 120, 130 with its own HARQ-ACK feedback and transmits the feedbacks to the network node 150. This may be accomplished by configuring the first wireless device 110 such that it utilizes the PUCCH to sends HARQ-ACK information. However, historically, all HARQ-ACKs sent on a PUCCH by the first wireless device 110 would belong to the first wireless device 110 only. In the present disclosure, changes in PUCCH are allowed making it possible for the first wireless device to send HARQ-ACK information belonging to multiple wireless devices, including itself.

Figure 2:
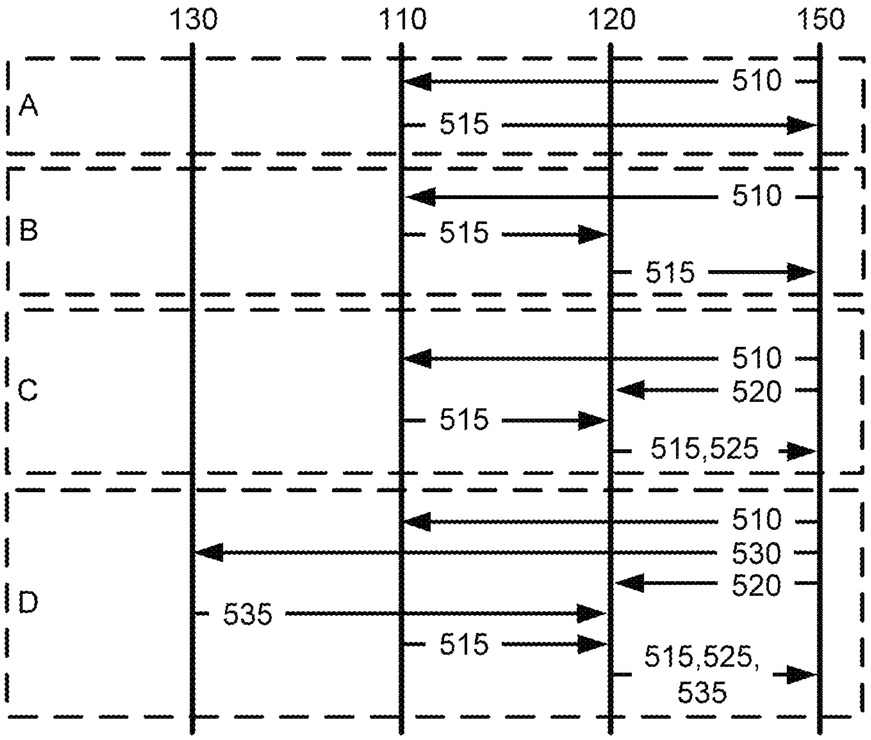
FIG. 2 is a schematic view of signaling scenarios according to different embodiments.

Turning now to the simplified signaling diagram of FIG. 2, four different signaling scenarios A-D will be introduced. Signals are indicated as horizontal lines, and a direction of the signals is indicated by an arrow pointing to the receiver of the signal. In FIG. 2, from the right, the vertical lines illustrate the network node 150, the second wireless device 120, the first wireless device 110 and the additional wireless devices 130.

In signaling scenario A of FIG. 2, the network node 150 sends a first transmission 510 to the first wireless device 110. In response to the first transmission 510, the first wireless device 110 sends a first HARQ-ACK/NACK 515 to the network node 150. Scenario A is a typical way of signaling a HARQ-ACK/NACK in a communications network 10.

In signaling scenario B of FIG. 2, the network node 150 still sends a first transmission 510 to the first wireless device 110, but rather having the first wireless device 110 sends the first HARQ-ACK/NACK 515 to the network node, the first HARQ-ACK/NACK 515 is received by the second wireless device 120 which in turn sends the first HARQ-ACK/NACK 515 to the network node. In other words, the first HARQ-ACK/NACK 515 from the first wireless device 110 is relayed to the network node 150 by the second wireless device 120. The wireless device 110, 120, 130 acting as a relay may, in sections of this disclosure be referenced to as a coordinator wireless device 110, 120, 130. Any of the devices mentioned herein may be the coordinator wireless device 110, 120, 130, but for consistency and simplicity of explanation, the second wireless device 120 will typically be the coordinator wireless device 110, 120, 130 relaying HARQ-ACK/NACKs 515, 525, 535. As will be detailed elsewhere, the first wireless device may or may not be aware of the first HARQ-ACK/NACK 515 being relayed or not.

Scenario B may be a scenario in which the first wireless device 110 is experiencing transmit difficulties from e.g. UL/DL link budget mismatch.

In signaling scenario C of FIG. 2, the network node 150 again sends a first transmission 510 to the first wireless device 110, but in this scenario, also sends a second transmission 520 to the second wireless device 120. The second wireless device 120 receives the first HARQ-ACK/NACK 515 from the first wireless device and combines this with a second HARQ-ACK/NACK 525 of the second wireless device 120 being in response to the second transmission 520. The second wireless device 120 sends the combined HARQ-ACK/NACK 515, 525 to the network node 150. As in scenario B, the first HARQ-ACK/NACK 515 from the first wireless device 110 is relayed to the network node 150 by the second wireless device 120, but in scenario C, the second wireless device 120 sends the first HARQ-ACK/NACK 515 together with the second HARQ-ACK/NACK 525.

Analogously, in signaling scenario D of FIG. 2, the network node sends a first transmission 510 to the first wireless device, a second transmission to the second wireless device 120 and an additional transmission 530 to the additional wireless device 130. In this scenario, the second wireless device 120 receives, from the first wireless device 110 a first HARQ-ACK/NACK 515 associated with the first transmission 510 and, from the additional wireless device 130, an additional HARQ-ACK/NACK 535 associated with the additional transmission 530. The second wireless device 120 sends its own second HARQ-ACK/NACK 525 associated with the second transmission 520 to the network node together with the first HARQ-ACK/NACK 515 and the additional HARQ-ACK/NACK 535.

From FIG. 2, it is clear that by allowing the second wireless device 120 to relay HARQ-ACK/NACK 515, 535 from other wireless devices 110, 130 problems previously presented are solved.

Figure 3:
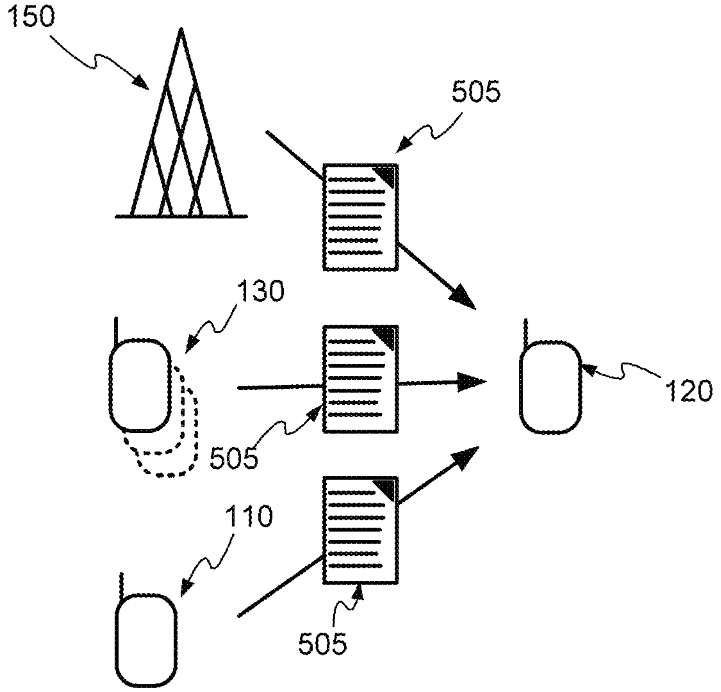
FIG. 3 is a schematic view of control information signaling scenarios according to different embodiments.

The second wireless device 120 is preferably configured to relay HARQ-ACK/NACK 515, 535 from the other wireless devices 110, 130, and as illustrated in FIG. 3, the configuration of relay of HARQ-ACK/NACK 515, 535 may be provided as control information 505 from the network node 150 and/or from the other wireless devices 110, 130. In embodiments wherein the control information 505 is provided by the network node, the control information 505 may be transmitted as e.g. uplink control information, UCI on the PUCCH or multiplexed with the PUSCH. When the control information 505 is provided by the other wireless devices 110, 130, it may be sent as a direct control message or preferably comprised in the HARQ-ACK/NACK 515, 535 to be relayed. The control information 505 is preferably communicated across the sidelink 15. When provided by the network node 150, the network node 150 may send DCI, i.e. dynamic PDSCH grant or SPS activation DCI or new DCI, to the second wireless device 120 indicating that the second wireless device 120 is to collect HARQ-ACK/NACK from other wireless devices 110, 130 and relay the collected HARQ-ACK/NACK to the network node 150. The other wireless devices 110, 130 may be e.g. wireless devices 110, 130 in a proximity of the second wireless device 120 allowing the other wireless devices 110, 130 to communicate with UE1 via device to device, D2D, communication technologies, e.g., the SL 15. The control information 505 may comprise e.g. one or more flags indicating whether the HARQ-ACK/NACK of the other wireless devices 110, 130 may be combined or not, identities of the other wireless devices 110, 130 etc.

In order to relay HARQ-ACK/NACK 515, 535 from the other wireless devices 110, 130, the second wireless device 120 preferably receives the HARQ-ACK/NACK 515, 535 from the other wireless devices 110, 130 prior to the relaying. The channel, medium or communication path across which the second wireless device 120 received the HARQ-ACK/NACK 515, 535 from the other wireless devices 110, 130 will be exemplified in the following, it should be emphasized that these are exemplary embodiments, and several others being within the scope of this disclosure may come to the mind of the skilled person after reading the following.

The HARQ-ACK/NACK 515, 535 to be relayed may be received by the second wireless device 120 on the PSFCH of the SL from the first wireless device 110. A modified channel over which HARQ-ACK/NACK 515, 535 information of the first wireless device 110 is transmitted to the second wireless device 120 may be formed e.g. by adding bit(s) in the transmitted information over PSFCH indicating that the HARQ-ACK/NACK 515, 535 feedback is related to the first wireless device 110 transmitted over sidelink channel.

The HARQ-ACK/NACK 515, 535 to be relayed may be received by the second wireless device 120 PSSCH on the SL from the first wireless device 110. The HARQ-ACK/NACK 515, 525 information of the first wireless device 110 may be multiplexed with data from first wireless device 110 sent over PSSCH to the second wireless device.

In some embodiments, the HARQ-ACK/NACK 515 information of the first wireless device 110 may be carried by PC5-RRC, the HARQ-ACK/NACK 515 information of the first wireless device 110 may be carried by MAC CE, or the HARQ-ACK/NACK 515 information of the first wireless device 110 may be carried by control a PDU of a protocol layer such as SDAP, PDCP, RLC, or an adaption protocol layer designed for Sidelink relay.

In one embodiment, the HARQ-ACK/NACK 515 of the first wireless device 110 may be sent over PSCCH using an existing SCI format, e.g. repurpose existing fields in the SCI format, or by using a new SCI format defined for relaying HARQ-ACK/NACK 515, 535 information of neighbor UEs.

In some embodiments, other licensed or unlicensed radio access technologies, RAT, are used e.g. Bluetooth, Zigbee, LoRa, WIFI, are used for communicating the HARQ-ACK/NACK 515, 535 to be relayed to the second wireless device 120. Any suitable protocol such as TCP/IP, proprietary protocols etc. may be utilized.

In some embodiments, a new channel may be introduced which enables physical layer decoding of HARQ-ACK/NACK 515, 535 transmission sent from other transmitting wireless devices 110, 130 by the receiving wireless device 120, e.g. the second wireless device 120. Subsequent to decoding, the receiving wireless device 120 may retransmit that information by optionally including its own information to the network node 150.

In some embodiments, a new channel which enables higher-layer decoding of HARQ-ACK/NACK 515, 535 transmission which are sent from other transmitting wireless devices 110, 130 by the receiving wireless device 120, e.g. the second wireless device 120. Subsequent to decoding, the receiving wireless device 120 may retransmit that information by optionally including its own information to the network node 150.

In some embodiments, for autonomous resource selection, the preferred scenario is where the network node 150 allocates a certain spectrum pool, carriers or resource for HARQ-ACK/NACK 515, 535 transmission from the first wireless device 110 to the second wireless device 120. For example, if the first wireless device 110 receives PDSCH from the network node 150 and it want sends to HARQ-ACK/NACK 515 to the network node 150 via relaying over the second wireless device 120, then the first wireless device may autonomously select resources, i.e. PRBs from given spectrum pool, to transmit HARQ-ACK/NACK 515 codebook to the second wireless device 120.

As disclosed above with some exemplifying embodiments, the second wireless device 120 may be provided with information regarding e.g. medium and resource allocation for relaying of HARQ-ACK/NACK 515, 535 from other wireless devices 110, 130. It should be mentioned that there may be further embodiments to this, in one embodiment, the network node 150 informs the first wireless device 110 to send its HARQ-ACK/NACK 515 information via the second wireless device 120 and accordingly the network node 150 may be configured to assign sidelink resources for transmitting HARQ-ACK/NACK 515, 535 feedbacks of other wireless devices 110, 130 to the second wireless device. In another embodiment, the resources are awarded to the first wireless device 110, but the decision of HARQ-ACK/NACK 515 information transmission is left to the first wireless device 110, that is to say, resources are allocated by the network node 150, but the transmission decision is autonomously made by the first wireless device 110. For instance, the first wireless device may be configured such that when it is able to transmit via UL, i.e. directly to the network node 150, it does so, otherwise the first wireless device 110 may relay the HARQ-ACK/NACK 515 information to the second wireless device 120, e.g. if UL channel is bad. In one embodiment, the first wireless device 110 may be configured to transmit HARQ-ACK/NACK 515 on both UL and via the second wireless device 120 for increased reliability. This option may be useful in situations where the UL for the first wireless device 110 is not reliable due to e.g. rapid fluctuations, fading etc. As an additional embodiment, the first wireless device may decide to forward its HARQ-ACK/NACK 515 information to the second wireless device in situations when there is no available PUCCH resource or PUSCH resource to transmit the HARQ-ACK/NACK 515 information in the closing time while the HARQ-ACK information is delay critical e.g., for URLLC. In this situation, the HARQ-ACK/NACK 515 information may be relayed to the network node 140 via the second wireless device 120 in order to reduce latency.

The control information 505 may comprise information indicating what resources to utilize when relaying HARQ-ACK/NACK 515, 535 from the other wireless devices 110, 130. In embodiments wherein the network node 150 allocate resources, the resources for relaying HARQ-ACK/NACK 515, 535 may comprise, but are not limited to, HARQ-ACK/NACK resources in specific cells/carriers, HARQ-ACK/NACK resources in specific BWPs of the same serving cell where the PDSCH receptions associated with the HARQ ACK occur, HARQ-ACK/NACK resources transmission using specific Transmission Reception Points, TRPs, DCI allocated HARQ-ACK/NACK resources indicated in a specific CORESET, and/or DCI allocated HARQ-ACK/NACK resources indicated by using specific DCI format. In the exemplified embodiment, the second wireless device 120 may relay HARQ-ACK/NACK 515, 535 from the other wireless devices 110, 130 utilizing e.g. MAC CE in PUSCH using a configured grant or a dynamic grant, RRC signaling in PUSCH using a configured grant or a dynamic grant etc.

The relaying functionality may, as exemplified above, be under control of the network, e.g. the network node 150 or in the case of NR, a scheduler in a gNB. This allows the network node 150 to schedule the second wireless device to perform, or not to perform relaying based on RRC parameter or DCI parameter. In other embodiments, the network node 150 may permit the second wireless device 120 to relay only the HARQ-ACK/NACK 515, 535 information of a permitted list of wireless devices 110, 130. That is to say, the second wireless device 120 only acts as relay for the wireless devices 110, 130 that are specified in a list provided by the network node 150. The list of wireless devices 110, 130 where relaying is permitted may be provided to the second wireless device by RRC parameter or DCI parameter. The list of wireless devices 110, 130 where relaying is permitted may be comprised in the control information 505. In another embodiment, the network node 150 may permit the second wireless device to relay HARQ-ACK/NACK 515, 535 information for specific services. For example, the relaying of only HARQ-ACK information of URLLC services is allowed but not eMBB or CMTC services. As the skilled person appreciates, the above listed embodiments are in no way strict alternatives but may be freely combined and the network node 150 may be configured to permit the second wireless device 120 to relay any combination of the above examples. For example, the relying of URLLC services of a permitted list of wireless devices 110, 130 is one workable embodiment.

In some embodiments, a wireless device 110, 120, 130, i.e. the first wireless device 110 or the additional wireless device 130 from the non-limiting examples of this disclosure, may under some conditions be configured to send HARQ-ACK/NNACK 515, 535 feedback on the UL and in under other conditions via relaying. UL transmission may be utilized when e.g. when a UL radio quality is above a UL quality threshold and relaying, relaying via the second wireless device 120, over SL when the UL radio quality is below the UL quality threshold. One advantage of this is that the delay is reduced if the direct HARQ-ACK/NACK 515, 535 feedback over UL is successful, compared to if only the relayed feedback is successful as there is generally an added delay when relaying. In this case one further embodiment, the first wireless device 110 is configured with two k1 values in DCI, e.g., the first k1 value is used to indicate the offset from PDSCH transmission to the direct HARQ feedback transmission over UL resource. The second k1 value is the offset from the PDSCH transmission to the relayed HARQ feedback transmitted/relayed to the second wireless device 120 over SL resource. In alternative embodiment, there is one k1 value in DCI, either it is used to transmit e.g. feedback in UL or transmit feedback over SL to the second wireless device 120.

In one embodiment, the relay selection/reselection may occur independent of the first wireless device 110 needs to transmit/relay its HARQ-ACK/NACK 515 information. Due to e.g. the first wireless device 110 being mobile or varying channel conditions, a new coordinator wireless device 120, 130 for relaying may be selected based on parameters such as signal strength, path loss, etc. for the first wireless device's L1 HARQ-ACK/NACK 515 information relaying capabilities. When a new coordinator wireless device is selected, and if there is a need to transmit HARQ-ACK/NACK 515, 525, 535 information, then first wireless device may be configured to send it via the new coordinator wireless device instead of via the old coordinator wireless device 120, the second wireless device. In other words, the second wireless device 120 is replaced by new coordinator wireless device for relaying the first wireless device's L1 HARQ-ACK information. This means that the first wireless device 110 continually/semi-persistently e.g. after every N slots/time units, scan the received signal strength from the neighboring wireless devices 120, 130 and the network node 150 to determine/select the best node to receive its UL transmission directly, which may be a wireless device, acting as a coordinator wireless device, or the network node 150. Alternatively, the first wireless device may be configured to trigger a relay selection/reselection when a current sidelink 15 between the first wireless device 110 and the second wireless device 120 has channel quality below a configured sideling quality threshold e.g. for a configured time period.

In one embodiment, a group of wireless devices 110, 130 is determined. The group of wireless devices 110, 130 is configured to transmit their HARQ-ACK 515, 535 information via the coordinator wireless device 120. The network node 150 may be configured to group wireless devices 110, 120, 130 based on one or more conditions where one condition may relate to a path loss between wireless devices e.g., the path loss between a wireless device 110, 120, 130, and the coordinator wireless device 120. If this path loss is below a path loss threshold, the wireless device 110, 120, 130 may be added to the group of wireless devices 110, 120, 130. Another condition may relate to a channel quality, e.g. if UL channel, over which HARQ-ACK CB is supposed to be transmitted is poor, then a nearby wireless device is chosen as coordinator wireless device so that the coordinator wireless device may relay the HARQ-ACK/NACK information of the wireless device suffering from poor UL. The channel quality may be measured and analyzed using indicators such UL signal strength and quality, RSRP, RSRQ, CSI report, etc. Another condition may relate to applications, services and/or traffic types. Wireless devices 110, 120, 130 may be grouped in case they have similar/same application, service, or traffic type as these may imply that they have similar traffic pattern and/or QoS requirements.

In one embodiment, the coordinator wireless device 120 combines HARQ-ACK/NACK of itself and at least one other wireless device 110, 130 based on a priority of the HARQ-ACK/NACK. Combination of feedback may, in this embodiment be considered if the HARQ-ACK/NACK 515, 525 of both wireless devices 110, 120 belongs to same priority, if the HARQ-ACK/NACK 515, 525 of both wireless devices 110, 120 belongs to mix of priority. The mix of priority may be exemplified by the coordinator wireless device having high priority HARQ-ACK/NACK 525, and the first wireless device 110 has low priority HARQ-ACK/NACK 515, or if both the coordinator wireless device 120 and the first wireless device 110 has a mix of high and low priority HARQ-ACK/NACK 515, 525.

Albeit this disclosure mainly focuses on relaying of HARQ-ACK and HARQ-NACK, it should be emphasized that in embodiments, it is possible that either the coordinator wireless device 120 or any of the wireless devices 110, 130 whose information is to be forwarded, may be configured to only relay a HARQ-ACK or a HARQ-NACK. For the wireless devices 110, 130 whose information is to be forwarded, this will reduce the signaling required between the coordinator wireless device 120 and the wireless devices 110, 130 whose information is to be forwarded, thereby saving power and reducing spectrum load. Where coordinator wireless device 120 is configured to only forward HARQ-ACK, this also reduces power consumption and spectrum load and is further beneficial as the network node 150 may be configured to retransmit a PDSCH if an associated HARQ-ACK is not received within a predetermined time period from the initial transmission of the PDSCH.

It should be mentioned that in some embodiments, whether HARQ-ACK information of e.g. the first wireless device 110 can be relayed via a neighboring wireless device, e.g. the second wireless device 120, may be configurable per service, traffic type, LCH or LCG. This means that the first wireless device 110 would only forward the HARQ-ACK associated with specific services, traffic types, LCHs or LCGs, which may be associated with specific Quality of Service, QOS, requirements. As a further embodiment, a first capability bit is defined. The first capability bit indicate whether an associated wireless device 110, 120, 130 supports to forward its HARQ-ACK information to the coordinator wireless device. As a further embodiment, a second capability bit is defined, indicating whether the associated wireless device 110, 120, 130 may be configured to work as coordinator wireless device for other wireless devices.

In one embodiment, DL DCI, e.g. DCI format 1_1, received by a wireless device 110, 120, 130 includes a field indicating whether the HARQ ACK timing indicator K1 in the DCI refers to the wireless device 110, 120, 130 from which the DL DCI was received, or to another wireless device 110, 120, 130. In case K1 refers to another wireless device 110, 120, 130, an ID of the wireless device 110, 120, 130 referred to may also be carried in the DCI.

In the following sections, exemplifying embodiments of how a coordinator wireless device 120 may configure a transmission of HARQ-ACK/NACK when relaying HARQ-ACK/NACK from other wireless devices 110, 120.

Figure 4A:
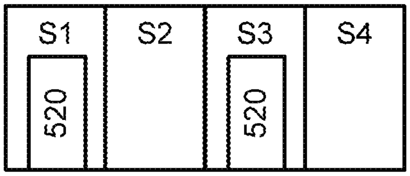
FIGS. 4*a-b* are DL slot configuration according to exemplary embodiments.
Figure 4B:
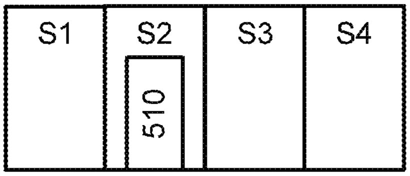
Figure 4C:
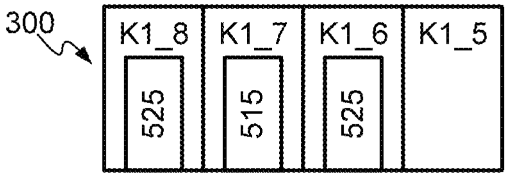
FIG. 4*c* is a schematic view of a codebook according to one embodiment.

With reference to FIGS. 4*a-c*, one embodiment of HARQ-ACK/NACK 515, 525, 535 slot configuration will be described exemplified with the first transmissions 510 and the second transmission 520 as previously introduced. The HARQ-ACK/NACK feedback transmissions 515, 525 of the first wireless device 110 and the second wireless device 120 are configured such that their DL HARQ processes do not overlap in the time-domain. In FIG. 4*a*, four slots S1-S4 are illustrated out of which the second transmissions 520 are present in a first slot S1 and a third slot S3. In FIG. 4*b*, which illustrate the same four slots S1-S4 as FIG. 4*a*, the first transmission 510 is present in a second slot S2. With this, the Type 1 CB construction for the feedback associated with multiple PDSCHs of multiple wireless devices may be configured as illustrated in FIG. 4*c*. The PDSCHs of the two wireless devices 110, 120 do not overlap, hence, in the CB construction, the HARQ-ACK/NACK feedback of the first wireless device 110 and the second wireless device 120 are combined in one row of HARQ-ACK/NACK codebook. As seen in a codebook 300 illustrated in FIG. 4*c*, the first wireless device 110 and the second wireless 120 device have been configured with one TDRA entry in a slot. The second wireless device 120 is allocated with two transmissions in the first slot S1 and the third slot S3, respectively with k1=8 and k1=6. The second wireless device 120 has been configured with a transmission in the second slot S2 with k1=7.

Figure 5:
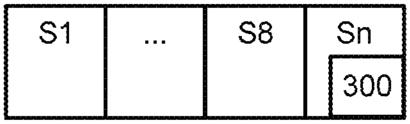
FIG. 5 is a schematic view of slot configuration according to one embodiment.

As illustrated in FIG. 5, the codebook 300 may be transmitted by the coordinator wireless device 120 at a next available UL slot. In one embodiment, the UL slot for transmission of the codebook 300 is a slot following an eighth DL slot S8.

Figure 6A:
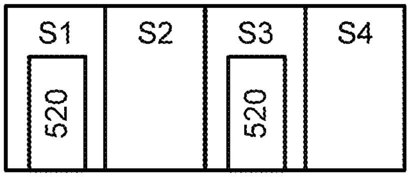
FIGS. 6*a-b* are DL slot configuration according to exemplary embodiments.
Figure 6B:
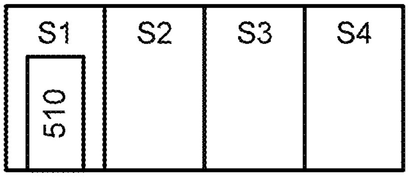
Figure 6C:
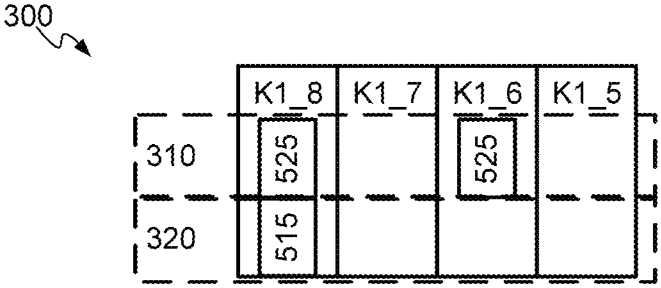
FIG. 6*c* is a schematic view of a codebook according to one embodiment.

In one embodiment, illustrated in FIGS. 6*a-c*, multiple PDSCHs allocations for different wireless devices overlap in time-domain. Therefore, in this case, HARQ-ACK/NACK information for different wireless devices cannot be transmitted as exemplified with reference to FIGS. 4*a-c*. As seen in FIGS. 6*a* and 6*b*, the first wireless device 110 and the second wireless device have the same configured TDRA entries in a slot or a time window, both wireless devices 110, 120 have transmissions scheduled in the first slot S1, with k1=8, and the second wireless device 120 also have transmission scheduled in the third slot S3, with k1=6. In this embodiment, the coordinator wireless device 120 constructs CB 300 where HARQ-ACK information of both the first wireless device 110 and the second wireless device in one codebook 300 are mapped to two rows, each of which representing HARQ-ACK/NACK information of a wireless device. In a further embodiment, the coordinator wireless device 120 is configured to indicate an ID of a wireless device 110, 120 for each row of the CB 300. In order to reduce the size of the codebook 300, the indicated ID may be a relative index, e.g. if the first wireless device 110 and the second wireless device 120 forms a group to help each other for relaying HARQ-ACK/NACK; a single bit field with value may indicate each wireless device 110, 120. For multiple wireless devices 110, 120, 130 in a group, a bitmap field may be introduced to indicate wireless devices 110, 120, 130 in the group. In an additional or alternative embodiment, the network node 150 has prior knowledge of which row is associated with which wireless device 110, 120.

Figure 7A:
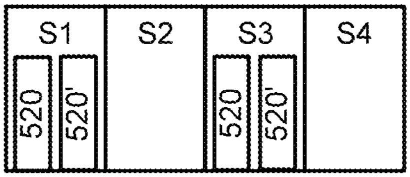
FIGS. 7*a-b* are DL slot configuration according to exemplary embodiments.
Figure 7B:
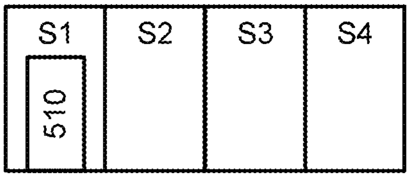
Figure 7C:
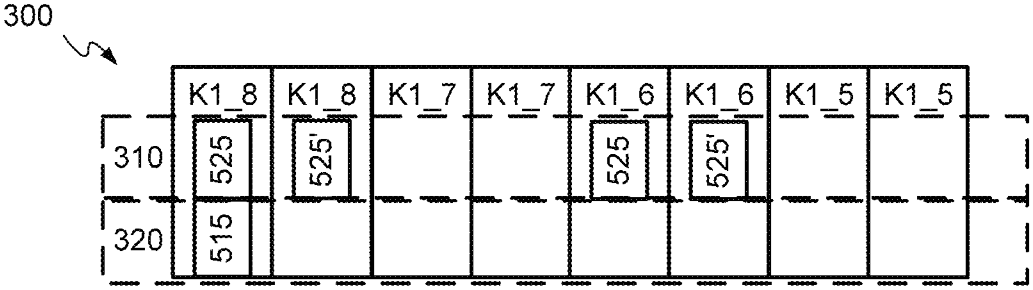
FIG. 7*c* is a schematic view of a codebook according to one embodiment.

As further embodiments to the CB 300 embodiments above, there may be scenarios, as illustrated in FIGS. 7*a*-*c* where different wireless devices 110, 120, 130 are configured with different TDRA entries which may result in different number of HARQ-ACK/NACK bits for different wireless devices, see FIGS. 7*a*-*b*. These scenarios it may be beneficial to further extend the codebook 300 by adding columns to correspond to the largest number of bits of each wireless device, FIG. 7*c*.

Additionally or alternatively, the codebook 300 may be constructed based on HARQ-ACK/NACK priority.

In embodiments wherein a type 2 codebook 300 is utilized, the coordinator wireless device may be configured to construct a type 2 CB which contains HARQ-ACK/NACK information of itself any additional wireless device 110, 120, 130 from which a HARQ-ACK/NACK is to be relayed. For type 2 CB construction, the coordinator wireless device 120 preferably has knowledge of the number of transmissions 510, 520, 530 itself and the additional wireless devices 110, 120, 130 are allocated with. This may be accomplished by the coordinator wireless device having knowledge related to the tDAI of the additional wireless devices 110, 120, 130.

For simplified explanation, $C_{DAI,UE1}$ indicates the number of scheduled transmissions for the coordinator wireless device 120 up to a time at which the DCI to the coordinator wireless device is received; $t_{DAI,UE1}$ indicates the total number of transmissions for all carriers of the coordinator wireless device 120 up to this point in time, and $t_{DAI,UE2}$ indicates the total number of transmissions for all carriers of the first wireless device 110 up to this point in time. As mention, in order to construct Type 2 CB 300, the coordinator wireless device 120 preferably knows about the total number of transmission in the first wireless device 110.

In one embodiment of type 2 codebook 300, in DCI, DAI counters are set by the network node 150 as $\{C_{DAI,UE1}, t_{DAI,UE1}+t_{DAI,UE}\}$ which are sent to the coordinator wireless device 120 and as $\{C_{DAI,UE2}, t_{DAI,UE2}\}$ which are sent to the first wireless device 110. The counters $t_{DAI,UE1}+t_{DAI,UE2}$ indicate the total number of allocated transmissions across all carriers of the first wireless device 110 and the coordinator wireless device 120 up to this point in time. Next, if the first wireless device 110 transmits its HARQ-ACK information, Type 2 CB 300 of the first wireless device 110, to the coordinator wireless device 120 over SL, and in addition, the coordinator wireless device 120 has knowledge of the total DAI, i.e. $t_{DAI,UE1}+t_{DAI,UE2}$, e.g. as indicated in the PDSCH allocation's DCI of the coordinator wireless device 120 or sent in some DCI. Consequently, the coordinator wireless device 120 can transmit NACK for non-reported transmissions by the first wireless device or the coordinator wireless device 120. In another embodiment, similar to the one above, instead of total DAI as $t_{DAI,UE1}+t_{DAI,UE2}$, the network node 150 may be configured to indicate total DAIs separately, where the DAI counters are set as $\{C_{DAI,UE1}, t_{DAI,UE1}, t_{DAI,UE2}\}$ which are sent to the coordinator wireless device 110 and as $\{C_{DAI,UE2}, t_{DAI,UE2}\}$ which is sent to the first wireless device 110.

In another embodiment, the first wireless device 110 sends its CB 300, which may be Type-1, Type-2 or one-shot to the coordinator wireless device 120. The coordinator wireless device 120 attaches/concatenates its Type 2 CB 300 to the received CB 300 of the first wireless device 110 and transmits this bigger sized CB 300 to the network node 150. If the network node 150 possesses knowledge of how these two codebooks 300 are attached, then there is no need to add the IDs of the wireless devices 110, 120 as key to the bigger sized CB 300. Otherwise, the coordinator wireless device 120 preferably adds the IDs of the wireless devices 110, 120 at relevant places of the CB 300, e.g. at the starting of each wireless device's codebook 300.

The teachings herein are workable also when one-shot codebook is utilized. In one such embodiment, an enhancement of a one-shot codebook 300 s transmitted by the coordinator wireless device 120 to the network node 150 wherein the codebook 300 contains the HARQ-ACK information of both the coordinator wireless device 120 and the first wireless device 110 for all HARQ processes. This may be exemplified in two embodiments.

In one embodiment, the HARQ process IDs, PIDs, are not shared. For example, per carrier, each UE may be allocated maximum 16 HARQ processes, then the coordinator wireless device 120 comprises HARQ-ACK information for all 16 HARQ processes of the coordinator wireless device 120 and the first wireless device in the CB 300. Consequently, the first wireless device 110 is preferably configured to provide the coordinator wireless device 120 with HARQ-ACK information of all its 16 or active HARQ processes. The coordinator wireless device 120 may be configured to assume NACK for any HARQ processes which the first wireless device did not provide. The codebook may be formed as [{UE #1-ID} {$PID_0$-A/N, . . . , $PID_{16}$-A/N}, {UE #2-ID} {$PID_0$-A/N, . . . , $PID_{16}$-A/N}].

In another embodiment, the HARQ processes are shared between the coordinator wireless device 120 and the first wireless device. In this embodiment, the coordinator wireless device 120 is preferably configured to transmit HARQ-ACK information of only 16 HARQ processes. For example, out of 16 per CB 300, the first 4 HARQ processes may be allocated to the coordinator wireless device 120 and the last 12 HARQ processes may be allocated to the first wireless device, then the CB 300 may be formed as [{$PID_0$-A/N, . . . , $PID_{16}$-A/N}].

Figure 8A:
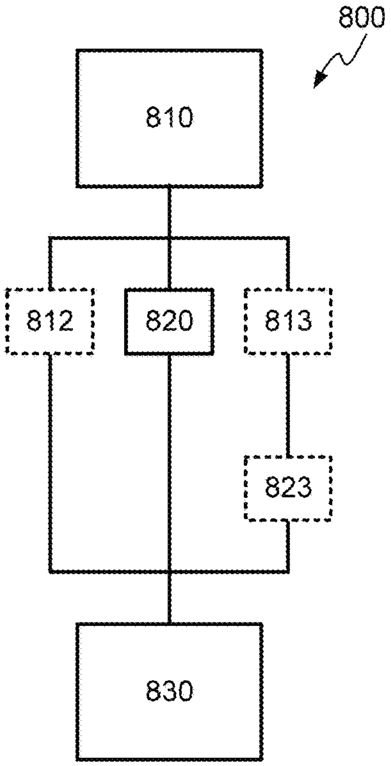
FIG. 8*a* is a schematic view of a method according to one embodiment.
Figure 8B:
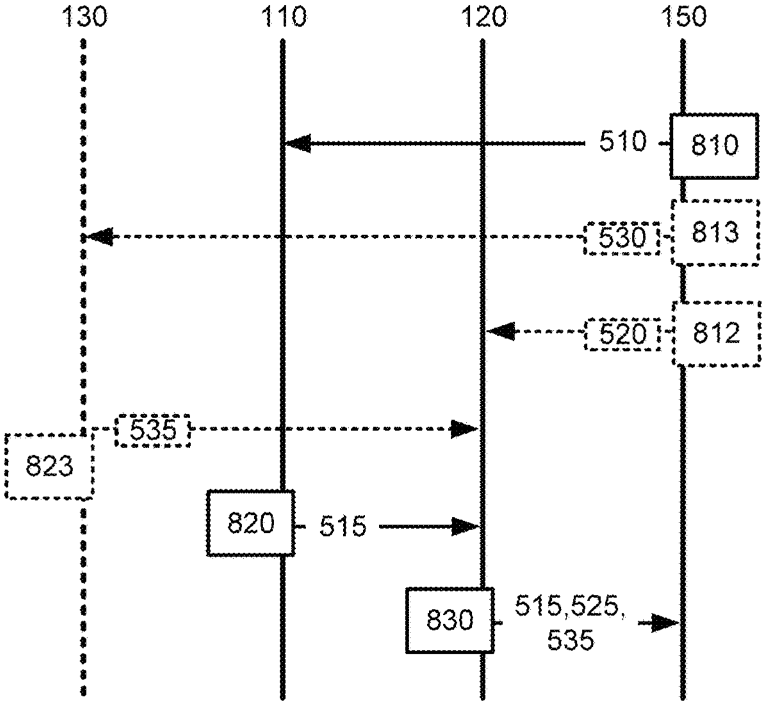
FIG. 8*b* is a signaling view of a method according to one embodiment.

Based the teachings of the present disclosure, a method of transferring HARQ-ACK/NACK 800 will be presented with reference to FIGS. 8*a* and 8*b*. The method 800 is preferably adapted for use in a wireless communication system 10, but may in fact be used in any type of communication system. FIG. 8*a* is a schematic overview of the method 800 and FIG. 8*b* is a signaling overview similar to that of FIG. 2 but with the corresponding method steps illustrated. The method 800 may be performed in a wireless communication system 10 comprising a network node 150, a first wireless device 110 and a second wireless device 120. These devices 110, 120, 150 may be any according to any embodiment of this disclosure. The network node 150 transmits 810 a first transmission 510 to the first wireless device 110. As a response to the transmitted 810 first transmission 510, the first wireless device 110 transmits 820 a first HARQ-ACK/NACK 515 which is associated with the first transmission 510. The second wireless device 120 is provided with control information 505 indicating that the second wireless device 120 is to forward HARQ-ACK/NACK 515 from at least the first wireless device 110 to the network node 150. Based on the control information 505, the second wireless device 120 relays 830 the first HARQ-ACK/NACK 515, which was received from the first wireless device 110, to the network node 150.

The control information 505 may be provided to the second wireless device 120 by any means available, and preferably by the means presented in this disclosure. The first HARQ-ACK/NACK 515, the HARQ-ACK/NACK 515 associated with the first transmission 510, may be sent to the second wireless device 120 by any means available, and preferably by the means presented in this disclosure.

The first transmission 510 may be transmitted 810 in a relayed signal path from the network node 150 to the first wireless device 110. In a preferred embodiment of the method 800, the first transmission 510 is transmitted 810 directly from the network node 150 to the first wireless device 110.

The final decision to actually relay 830 the first HARQ-ACK/NACK 515 by the second wireless device 120 may, as detailed elsewhere in this disclosure, be taken by e.g. the network node 150, the first wireless device 110, or the second wireless device 120. If, for instance, the first wireless device takes the decision to relay 830 the first HARQ-ACK/NACK, or any HARQ-ACK/NACK for that matter, may be based on e.g. an UL channel quality of the first wireless device 110, an UL channel resource availability of the first wireless device 110, an UL channel capacity of the first wireless device 110, and/or an urgency associated with the first HARQ-ACK/NACK 515 etc. Similarly, if the decision lies with the network node 150, the criteria may comprise the same basis as those listed above, but preferably with the addition of the corresponding basis relating to the second wireless device 120.

As explained, the teachings of this disclosure are workable also for relaying 830 HARQ-ACK/NACK information from more than one wireless device 110, 130. This means that the method 800 may further comprise the network node 150 transmitting 813 an additional transmission 530 to one of the one or more additional wireless devices 130 of the wireless communication network 10. These additional wireless devices 130 are preferably configured to transmit 823 an additional HARQ-ACK/NACK 535 associated with the additional transmission 530. As previously explained, based on the control information 505, the second wireless device 120 relays 830 the first HARQ-ACK/NACK 515 together with the additional HARQ-ACK/NACK 535 to the network node 150.

The method 800 may further comprise a second transmission 520 being transmitted 812 by the network node 150 to the second wireless device 120. The second wireless device 120 may be configured to combine its own HARQ-ACK/NACK 525 associated with the second transmission 520 in the relaying 830 of other HARQ-ACK/NACK 515, 525.

Figure 9A:
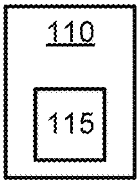
FIGS. 9*a-c* are schematic views of a first wireless device and associated computer program product according to one embodiment.

In FIG. 9*a*, a schematic view of the first wireless device 110 according to one embodiment is shown. The first wireless device 110 comprises one or more controllers 115 which may be configured to, when the first wireless device 110 is operable in a wireless communication system 10, perform the steps associated with first wireless device 110 of the method 800 according to this disclosure.

Figure 9B:
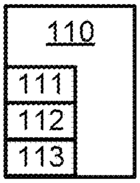

FIG. 9*b* illustrates another example implementation of the first wireless device 110, which may be in the form of a UE. The first wireless device 110 comprises a processor 111, a memory 112 and a communications interface 113 with transmission and reception capabilities. The memory 112 comprises instructions executable by the processor 111 whereby the first wireless device 110 is operative to, see e.g. FIGS. 8*a*-*b*, receive the first transmission 510, and responsive thereto, transmit 820 the first HARQ-ACK/NACK 515 to the second wireless device 120. To this end, said memory 112 comprising instructions executable by the processor 111 whereby the first wireless device 110 is operative to perform the steps of the method 800 relating to the first wireless device 110 as described in conjunction with FIGS. 8*a* and 8*b*.

Figure 9C:
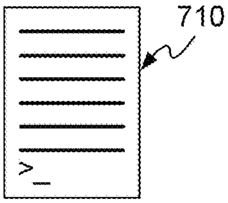

FIG. 9*c* is a schematic view of a computer program product 710 according to one embodiment. The computer program product 710 comprises instructions which, when executed on at least one processor 111 or controller 115 of the first wireless device 110, cause the at least one processor 110 or controller 115 to carry out the method 800 and/or any other features listed in this disclosure related to the first wireless device 110.

Figure 10A:
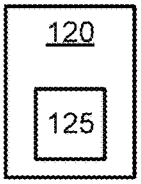
FIGS. 10*a-c* are schematic views of a second wireless device and associated computer program product according to one embodiment.

In FIG. 10*a*, a schematic view of the second wireless device 120 according to one embodiment is shown. The second wireless device 120 comprises one or more controllers 125 which may be configured to, when the second wireless device 120 is operable in a wireless communication system 10, perform the steps associated with second wireless device 120 of the method 800 according to this disclosure.

Figure 10B:
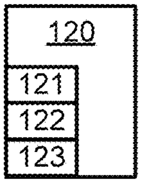

FIG. 10*b* illustrates another example implementation of the second wireless device 120, which may be in the form of a UE. The second wireless device 120 comprises a processor 121, a memory 122 and a communications interface 123 with transmission and reception capabilities. The memory 122 comprises instructions executable by the processor 121 whereby the second wireless device 120 is operative to, see e.g. FIGS. 8*a*-*b*, receive the first HARQ-ACK/NACK 51, and responsive to control information 505 to that effect, relay 830 the first HARQ-ACK/NACK 515 to the network node 150. To this end, said memory 122 comprising instructions executable by the processor 121 whereby the second wireless device 120 is operative to perform the steps of the method 800 relating to the second wireless device 120 as described in conjunction with FIGS. 8*a* and 8*b*.

Figure 10C:
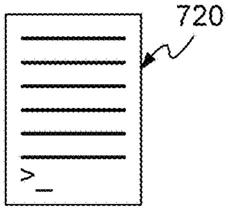

FIG. 10*c* is a schematic view of a computer program product 720 according to one embodiment. The computer program product 710 comprises instructions which, when executed on at least one processor 121 or controller 125 of the second wireless device 120, cause the at least one processor 120 or controller 125 to carry out the method 800 and/or any other features listed in this disclosure related to the second wireless device 120.

Figure 11A:
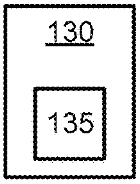
FIGS. 11*a-c* are schematic views of an additional wireless device and associated computer program product according to one embodiment.

In FIG. 11*a*, a schematic view of the additional wireless device 130 according to one embodiment is shown. The additional wireless device 130 comprises one or more controllers 135 which may be configured to, when the additional wireless device 130 is operable in a wireless communication system 10, perform the steps associated with additional wireless device 130 of the method 800 according to this disclosure.

Figure 11B:
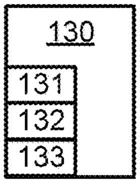

FIG. 11*b* illustrates another example implementation of the additional wireless device 130, which may be in the form of a UE. The additional wireless device 130 comprises a processor 131, a memory 132 and a communications interface 133 with transmission and reception capabilities. The memory 132 comprises instructions executable by the processor 131 whereby the additional wireless device 130 is operative to, see e.g. FIGS. 8*a-b*, receive the additional transmission 530, and responsive thereto, transmit 823 the additional HARQ-ACK/NACK 535 to the second wireless device 120. To this end, said memory 132 comprising instructions executable by the processor 131 whereby the additional wireless device 130 is operative to perform the steps of the method 800 relating to the additional wireless device 130 as described in conjunction with FIGS. 8*a* and 8*b*.

Figure 11C:
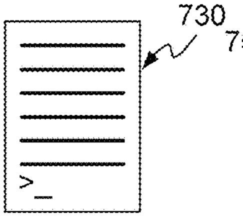

FIG. 11*c* is a schematic view of a computer program product 730 according to one embodiment. The computer program product 730 comprises instructions which, when executed on at least one processor 131 or controller 135 of the additional wireless device 130, cause the at least one processor 130 or controller 135 to carry out the method 800 and/or any other features listed in this disclosure related to the additional wireless device 110.

Figure 12A:
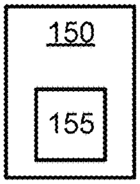
FIGS. 12*a-c* are schematic views of a network node and associated computer program product according to one embodiment.

In FIG. 12*a*, a schematic view of the network node 150 according to one embodiment is shown. The network node 150 comprises one or more controllers 155 which may be configured to, when network node 150 is operable in a wireless communication system 10, perform the steps associated with network node 150 of the method 800 according to this disclosure.

Figure 12B:
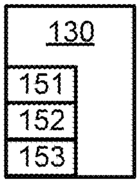

FIG. 12*b* illustrates another example implementation of the network node 150, which may be in the form of a gNB. The network node 150 comprises a processor 151, a memory 152 and a communications interface 153 with transmission and reception capabilities. The memory 152 comprises instructions executable by the processor 151 whereby the network node 150 is operative to, see e.g. FIGS. 8*a-b*, transmit 810 the first transmission 510 to the first wireless device 110, receive, in responsive thereto receive the first HARQ-ACK/NACK 515 relayed 830 by the second wireless device 120. To this end, said memory 152 comprising instructions executable by the processor 151 whereby the additional wireless device 150 is operative to perform the steps of the method 800 relating to network node 150 as described in conjunction with FIGS. 8*a* and 8*b*.

Figure 12C:
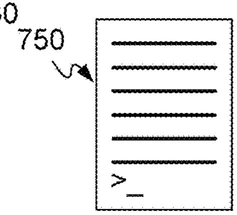

FIG. 12*c* is a schematic view of a computer program product 750 according to one embodiment. The computer program product 750 comprises instructions which, when executed on at least one processor 151 or controller 155 of the network node 150, cause the at least one processor 150 or controller 155 to carry out the method 800 and/or any other features listed in this disclosure related to the network node 150.

Figure 13:
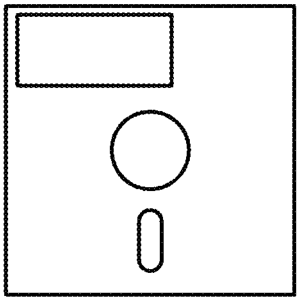
FIG. 13 is a schematic view of a carrier according to some embodiments.

FIG. 13 is a schematic view of a carrier 700 according to one exemplary embodiment. The carrier 700 may be any one of an electronic signal, an optical signal, a radio signal, or a computer readable storage medium. In one further embodiment of the carrier 700, the carrier 700 comprises the computer program product 710 for the first wireless device 110. In an alternative embodiment of the carrier 700, the carrier 700 comprises the computer program product 720 for the second wireless device 120. In another alternative embodiment of the carrier 700, the carrier 700 comprises the computer program product 730 for the additional wireless device 120. In another alternative embodiment of the carrier 700, the carrier 700 comprises the computer program product 750 for the network node 150.

Figure 14:
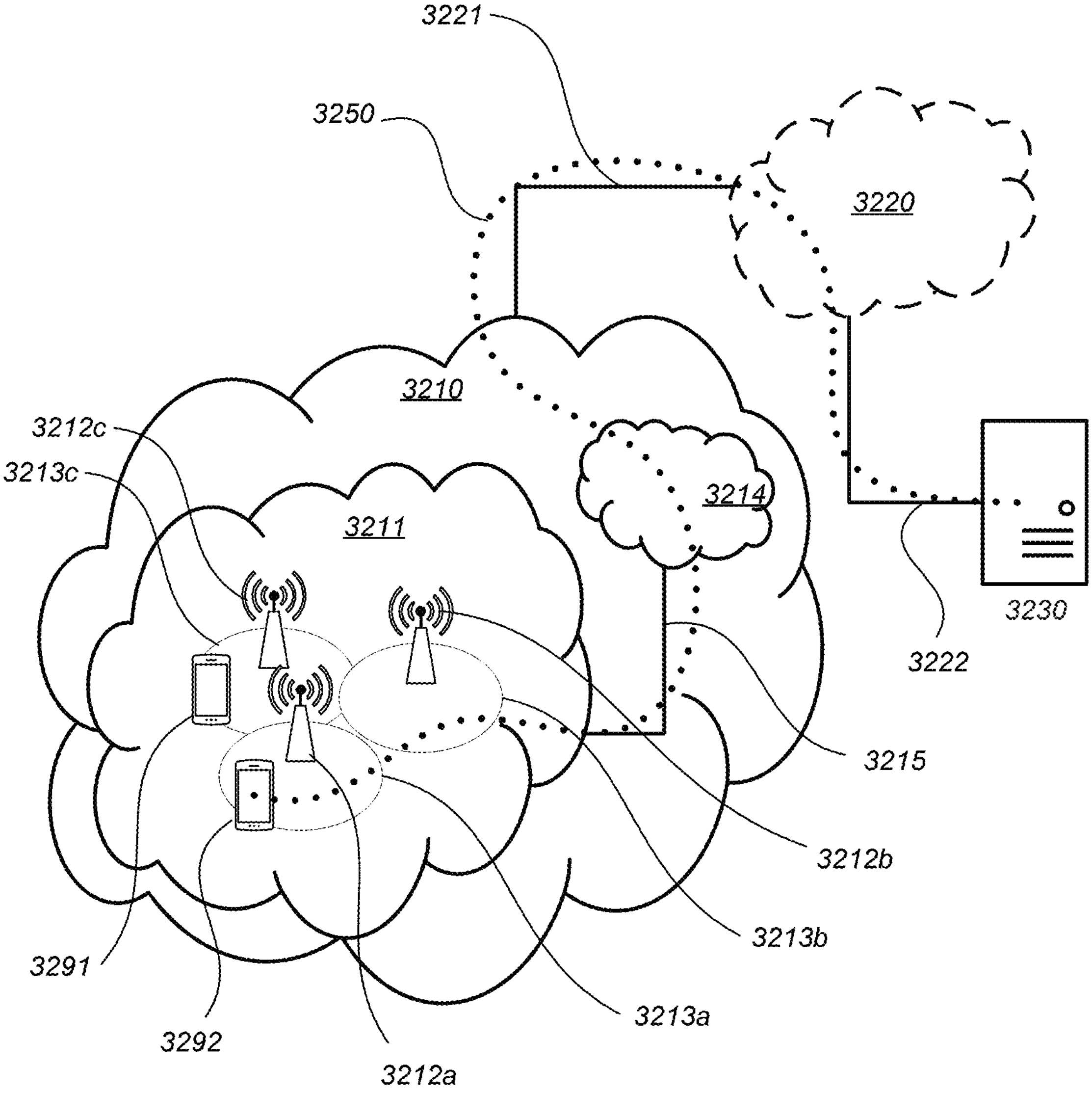
FIG. 14 is a generalized block diagram of a host computer communicating via a base station with a user equipment over a partially wireless connection.

With reference to FIG. 14, in accordance with an embodiment, a communication system, which may the wireless communication system 10, includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, which may be the wireless communication system 10, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
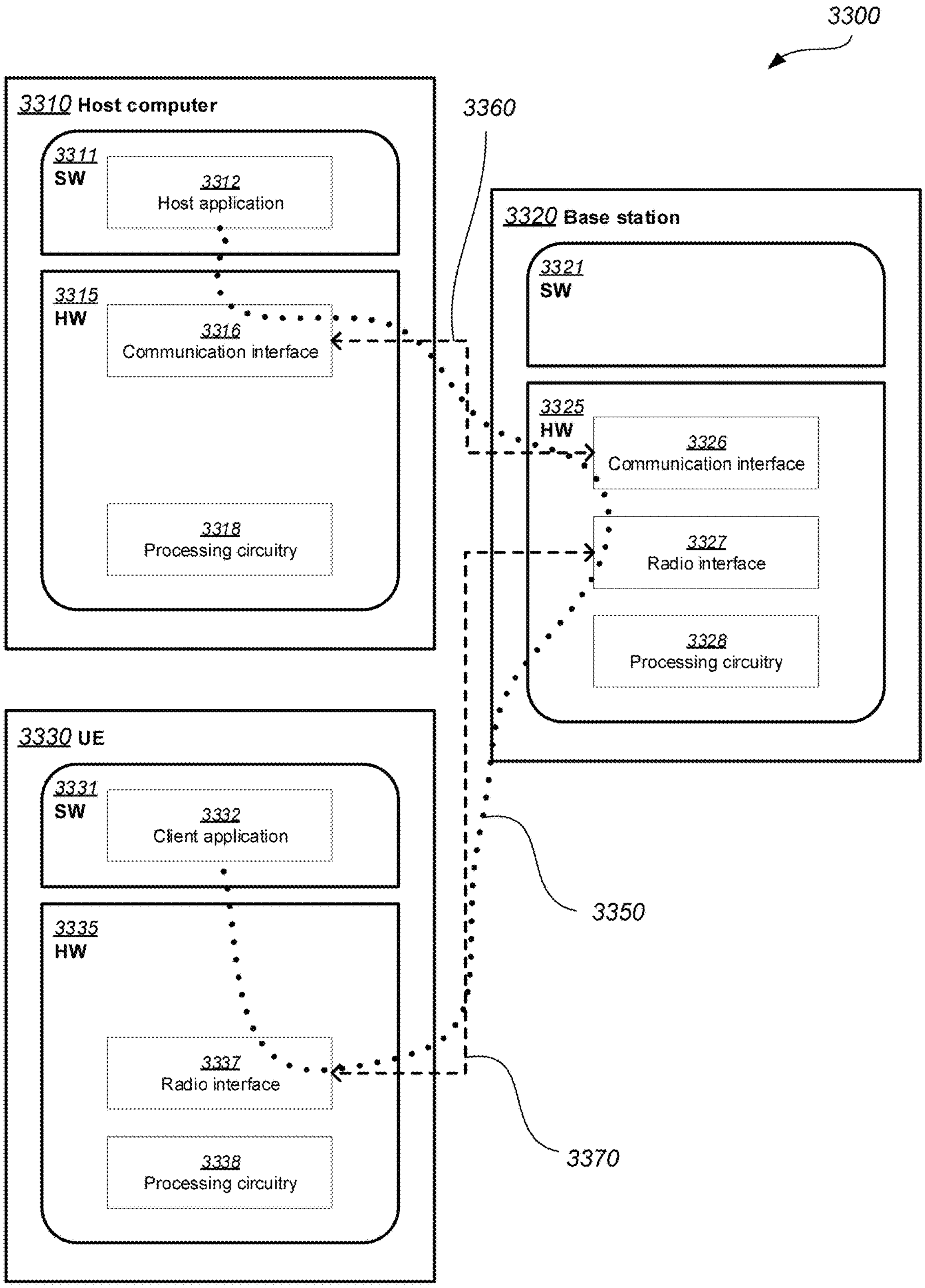
FIG. 15 is a flowchart illustrating methods implemented in a communication system including a host computer, a base station and a user equipment.

It is noted that the host computer 3310, base station 3320 and UE 3330 illustrated in FIG. 15 may be identical to the host computer 3230, one of the base stations 3212*a*, 3212*b*, 3212*c* and one of the UEs 3291, 3292 of FIG. 14, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may, as previously explained, improve spectrum efficiency, reliability etc. and thereby provide benefits such as e.g. reduced user waiting time etc.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 16:
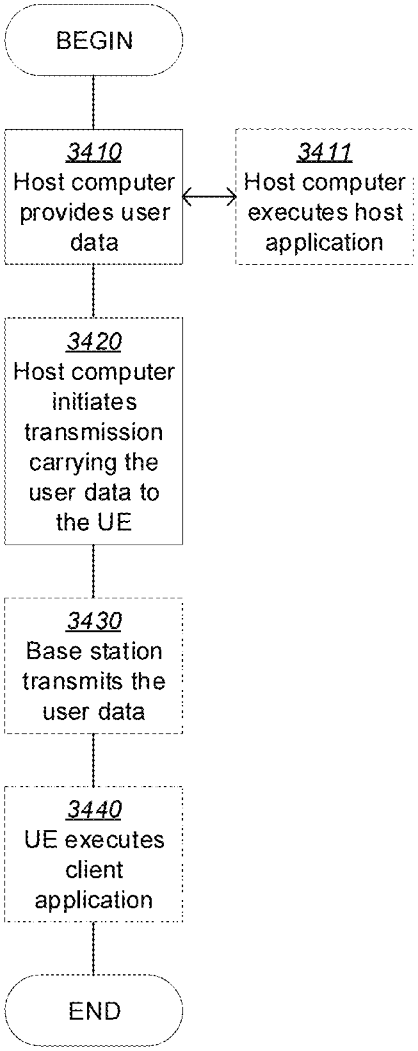
FIG. 16 is a flowchart illustrating methods implemented in a communication system including a host computer, a base station and a user equipment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 17:
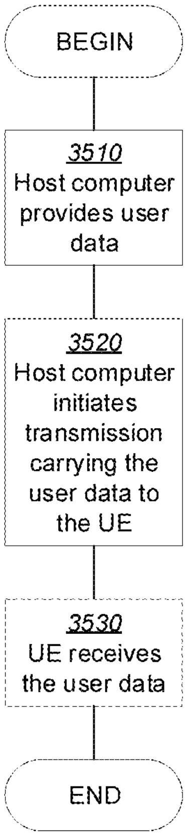
FIG. 17 is a flowchart illustrating methods implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 18:
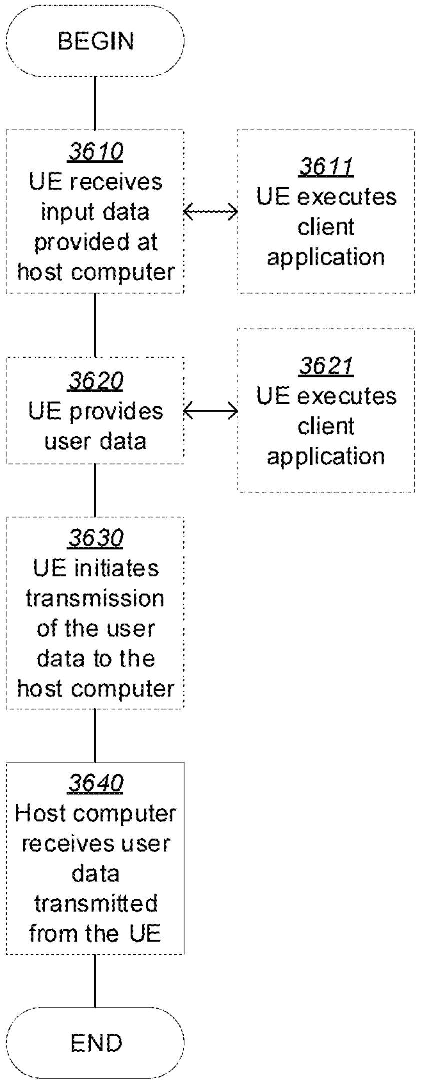
FIG. 18 is a flowchart illustrating methods implemented in a communication system including a host computer, a base station and a user equipment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 19:
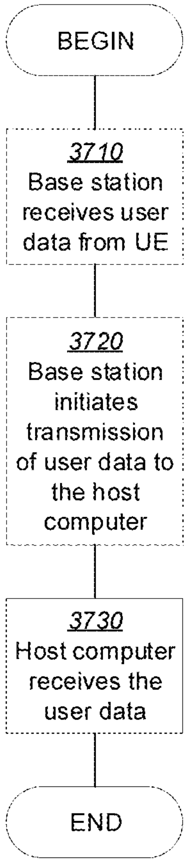
FIG. 19 is a flowchart illustrating methods implemented in a communication system including a host computer, a base station and a user equipment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The following are a selection of numbered embodiments relating to the present disclosure.

1. A base station configured to communicate with a user equipment (UE), the base station comprising a radio interface and processing circuitry configured to perform the functions relating to the network node 150 of the method 800.

5. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform the functions relating to the network node 150 of the method 800.

6. The communication system of embodiment 5, further including the base station.

7. The communication system of embodiment 6, further including the UE, wherein the UE is configured to communicate with the base station.

8. The communication system of embodiment 7, wherein:

the processing circuitry of the host computer is configured to execute a host application, thereby providing the user data; and the UE comprises processing circuitry configured to execute a client application associated with the host application.

11. A method implemented in a base station, comprising the steps relating to the network node 150 of the method 800.

15. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station is configured to perform the steps relating to the network node 150 of the method 800.

16. The method of embodiment 15, further comprising:

at the base station, transmitting the user data.

17. The method of embodiment 16, wherein the user data is provided at the host computer by executing a host application, the method further comprising:

at the UE, executing a client application associated with the host application.

21. A user equipment (UE) configured to communicate with a base station, the UE comprising a radio interface and processing circuitry configured to perform the functions relating to the second wireless device 120 of the method 800.

25. A communication system including a host computer comprising:

processing circuitry configured to provide user data; and a communication interface configured to forward user data to a cellular network for transmission to a user equipment (UE), wherein the UE comprises a radio interface and processing circuitry, the UE's processing circuitry configured to perform the functions relating to the second wireless device 120 of the method 800.

26. The communication system of embodiment 25, further including the UE.

27. The communication system of embodiment 26, wherein the cellular network further includes a base station configured to communicate with the UE.

28. The communication system of embodiment 26 or 27, wherein:

the processing circuitry of the host computer is configured to execute a host application, thereby providing the user data; and the UE's processing circuitry is configured to execute a client application associated with the host application.

31. A method implemented in a user equipment (UE), comprising performing the steps relating to the second wireless device 120 of the method 800.

35. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE is configured to perform the steps relating to the second wireless device 120 of the method 800.

36. The method of embodiment 35, further comprising:

at the UE, receiving the user data from the base station.

41. A user equipment (UE) configured to communicate with a base station, the UE comprising a radio interface and processing circuitry configured to perform the functions relating to the second wireless device 120 of the method 800.

45. A communication system including a host computer comprising:

a communication interface configured to receive user data originating from a transmission from a user equipment (UE) to a base station, wherein the UE comprises a radio interface and processing circuitry, the UE's processing circuitry configured to perform the functions relating to the second wireless device 120 of the method 800.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:

the processing circuitry of the host computer is configured to execute a host application; and the UE's processing circuitry is configured to execute a client application associated with the host application, thereby providing the user data.

49. The communication system of embodiment 46 or 47, wherein:

the processing circuitry of the host computer is configured to execute a host application, thereby providing request data; and the UE's processing circuitry is configured to execute a client application associated with the host application, thereby providing the user data in response to the request data.

51. A method implemented in a user equipment (UE), comprising the steps relating to the second wireless device 120 of the method 800.

52. The method of embodiment 51, further comprising:

providing user data; and forwarding the user data to a host computer via the transmission to the base station.

55. A method implemented in a communication system including a host computer, a base station and a user equipment (UE), the method comprising:

at the host computer, receiving user data transmitted to the base station from the UE, wherein the UE is configured to perform the functions relating to the second wireless device 120 of the method 800.

56. The method of embodiment 55, further comprising:

at the UE, providing the user data to the base station.

57. The method of embodiment 56, further comprising:

at the UE, executing a client application, thereby providing the user data to be transmitted; and at the host computer, executing a host application associated with the client application.

58. The method of embodiment 56, further comprising:

at the UE, executing a client application; and at the UE, receiving input data to the client application, the input data being provided at the host computer by executing a host application associated with the client application, wherein the user data to be transmitted is provided by the client application in response to the input data.

61. A base station configured to communicate with a user equipment (UE), the base station comprising a radio interface and processing circuitry configured to perform the functions relating to the network node 150 of the method 800.

65. A communication system including a host computer comprising a communication interface configured to receive user data originating from a transmission from a user equipment (UE) to a base station, wherein the base station comprises a radio interface and processing circuitry, the base station's processing circuitry configured to perform the functions relating to the network node 150 of the method 800.

66. The communication system of embodiment 65, further including the base station.

67. The communication system of embodiment 66, further including the UE, wherein the UE is configured to communicate with the base station.

68. The communication system of embodiment 67, wherein:

the processing circuitry of the host computer is configured to execute a host application;

the UE is configured to execute a client application associated with the host application, thereby providing the user data to be received by the host computer.

71. A method implemented in a base station, comprising the steps relating to the network node 150 of the method 800.

75. A method implemented in a communication system including a host computer, a base station and a user equipment (UE), the method comprising:

at the host computer, receiving, from the base station, user data originating from a transmission which the base station has received from the UE, wherein the UE is configured to perform the steps relating to the second wireless device 120 of the method 800.

76. The method of embodiment 75, further comprising:

at the base station, receiving the user data from the UE.

77. The method of embodiment 76, further comprising:

at the base station, initiating a transmission of the received user data to the host computer.

The invention claimed is:

1. A method of transferring Hybrid Automatic Repeat Request, HARQ, positive Acknowledgement, ACK, or Negative Acknowledgement, NACK, in a wireless communication system comprising a first wireless device, a second wireless device and a network node, wherein the network node is a base station, the method comprising:

transmitting, by the network node, a first transmission directly to the first wireless device;

based on the first transmission received from the network node, determining, by the first wireless device, that a first HARQ-ACK/NACK should be relayed by the second wireless device based on at least one of:

an uplink, UL, channel quality of the first wireless device, an UL channel resource availability of the first wireless device, an UL channel capacity of the first wireless device, and/or an urgency associated with the first HARQ-ACK/NACK;

transmitting, by the first wireless device to the second wireless device, the first HARQ-ACK/NACK associated with the first transmission received by the first wireless device from the network node; and responsive to control information provided to the second wireless device indicating that the first HARQ-ACK/NACK is to be forwarded to the network node:

relaying, by the second wireless device, the first HARQ-ACK/NACK to the network node.

2. The method of claim 1, wherein, responsive to that the first HARQ-ACK/NACK is to be relayed by the second wireless device, the first HARQ-ACK/NACK is transmitted across a sidelink.

3. The method of claim 2, wherein the sidelink is one or more of:

a Physical Sidelink Feedback Channel, PSFCH, a Physical Sidelink Shared Channel, PSSCH, a Physical Sidelink Control Channel, PSCCH, a non-cellular communications link, a channel enabling physical layer decoding of HARQ-ACK/NACK, and/or a channel enabling higher-layer decoding of HARQ-ACK/NACK.

4. The method of claim 2, wherein the sidelink is selected by the first wireless device based on allocated resources provided by the network node.

5. The method of claim 2, wherein the sidelink is assigned by the network node.

6. The method of claim 1, wherein the control information is provided to the second wireless device at least as an indication comprised in the first HARQ-ACK/NACK associated with first transmission.

7. The method of claim 1, wherein the wireless communication system further comprises one or more additional wireless devices and the method further comprises:

transmitting, by the network node, an additional transmission to one of the one or more additional wireless devices; in response thereto transmitting, by said one of the one or more additional wireless devices, an additional HARQ-ACK/NACK associated with the additional transmission; and responsive to control information provided to the second wireless device indicating that the additional HARQ-ACK/NACK and the first HARQ-ACK/NACK is to be forwarded to the network node:

relaying, by the second wireless device, the first HARQ-ACK/NACK together with the additional HARQ-ACK/NACK to the network node.

8. The method of claim 7, further comprising:

transmitting, by the network node, a second transmission to the second wireless device;

and the step of relaying comprises relaying, by the second wireless device, a second HARQ-ACK/NACK associated with second transmission together with any other HARQ-ACK/NACK that are to be relayed to the network node.

9. The method of claim 7, wherein the step of relaying comprises combining the first HARQ-ACK/NACK with any other HARQ-ACK/NACK that are to be relayed to the network node to provide a combined HARQ-ACK/NACK and relaying, by the second wireless device the combined HARQ-ACK/NACK to the network node.

10. The method of any of the claim 7, wherein at least one of the first transmission, the second transmission and/or the additional transmission are sent at different timeslots of a codebook, the HARQ-ACKs/NACKs associated with the transmissions sent at different timeslots and relayed by the second wireless device, are coded in one single line of the codebook.

11. The method of any of the claim 7, wherein at least one of the first transmission, the second transmission and/or the additional transmission are sent at overlapping timeslots of the codebook, the HARQ-ACKs/NACKs associated with the transmissions sent at overlapping timeslots and relayed by the second wireless device, are coded on separate lines of the codebook, wherein each separate line is associated with a respective wireless device.

12. The method of claim 1 wherein only a HARQ-ACK is relayed.

13. A first wireless device, comprising one or more controllers configured to, when the first wireless device is operable in a wireless communication system, receive a first transmission directly from a base station of the wireless communication system;

based on the first transmission received from the network node, determine that a first HARQ-ACK/NACK should be relayed by a second wireless device of the wireless communication system, based on at least one of:

an uplink, UL, channel quality of the first wireless device, an UL channel resource availability of the first wireless device, an UL channel capacity of the first wireless device, and/or an urgency associated with the first HARQ-ACK/NACK, and transmit, to the second wireless device, the first HARQ-ACK/NACK associated with the first transmission received by the first wireless device from the network node, wherein the first HARQ-ACK/NACK comprises an indication which indicates to the second network device that the first HARQ-ACK/NACK is to be forwarded to the base station.

14. A wireless communication system comprising a first wireless device, a second wireless device, and a base station, wherein the base station comprises one or more controllers configured to transmit a first transmission directly to the first wireless device;

the first wireless device comprises one or more controllers configured to, in response to the first transmission from the network node, determine that a first HARQ-ACK/NACK should be relayed by the second wireless device based on at least one of:

an uplink, UL, channel quality of the first wireless device, an UL channel resource availability of the first wireless device, an UL channel capacity of the first wireless device, and/or an urgency associated with the first HARQ-ACK/NACK; and transmit, to the second wireless device, the first HARQ-ACK/NACK associated with the first transmission received by the first wireless device from the network node; and the second wireless device comprises one or more controllers configured to, responsive to control information provided to the second wireless device indicating that the first HARQ-ACK/NACK is to be forwarded to the base station, relay the first HARQ-ACK/NACK to the base station.

15. The wireless communication system of claim 14, further comprising an additional wireless device which comprises one or more controllers configured to receive an additional transmission from the base station, and in response thereto, transmit an additional HARQ-ACK/NACK associated with the additional transmission; and responsive to control information provided to the second wireless device indicating that the additional HARQ-ACK/NACK and the first HARQ-ACK/NACK is to be forwarded to the base station, relay the first HARQ-ACK/NACK together with the additional HARQ-ACK/NACK to the base station.

* * * * *